US012287713B1

(12) United States Patent
LaMeres et al.

(10) Patent No.: US 12,287,713 B1
(45) Date of Patent: Apr. 29, 2025

(54) FAULT-TOLERANT COMPUTER SYSTEM WITH CONFIGURABLE COPROCESSOR COMPONENT AND METHODS THEREOF

(71) Applicants: MONTANA STATE UNIVERSITY, Bozeman, MT (US); RESILIENT COMPUTING, LLC, Bozeman, MT (US)

(72) Inventors: Brock Jerome LaMeres, Bozeman, MT (US); Christopher Michel Major, Belgrade, MT (US); Hezekiah Ajax Austin, Bozeman, MT (US)

(73) Assignees: MONTANA STATE UNIVERSITY, Bozeman, MT (US); RESILIENT COMPUTING, LLC, Bozeman, MT (US)

( * ) Notice: Subject to any disclaimer, the term of this patent is extended or adjusted under 35 U.S.C. 154(b) by 0 days.

(21) Appl. No.: 18/951,131

(22) Filed: Nov. 18, 2024

(51) Int. Cl.
G06F 11/00 (2006.01)
G06F 11/20 (2006.01)

(52) U.S. Cl.
CPC .... *G06F 11/2041* (2013.01); *G06F 2201/805* (2013.01)

(58) Field of Classification Search
CPC .................. G06F 11/2041; G06F 2201/805
See application file for complete search history.

(56) References Cited

U.S. PATENT DOCUMENTS

| | | | |
|---|---|---|---|
| 5,931,959 A * | 8/1999 | Kwiat | G06F 11/1489 714/48 |
| 7,237,148 B2 | 6/2007 | Czajkowski et al. | |
| 7,859,292 B1 * | 12/2010 | Shuler, Jr. | H03K 19/0033 326/46 |
| 8,738,860 B1 | 5/2014 | Griffin et al. | |
| 11,966,284 B1 | 4/2024 | LaMeres et al. | |

(Continued)

OTHER PUBLICATIONS

Holmes-Siedle, A., Adams, L., "Handbook of radiation Effects", NY, Oxford Univ. Press, 2002.

(Continued)

*Primary Examiner* — Jason B Bryan
(74) *Attorney, Agent, or Firm* — THE MARBURY LAW GROUP PLLC

(57) ABSTRACT

A fault-tolerant computer system includes a plurality of redundant processor cores configured to simultaneously execute identical sets of processor-executable instructions, and a coprocessor component including a data storage component and a configurable logic region, where the plurality of processor cores are configured with processor-executable instructions to perform operations including configuring the configurable logic region of the coprocessor component with a first coprocessing module, and controlling the first coprocessing module to perform first processing operations on data located in the data storage component. In various embodiments, the redundant processor cores and the coprocessor component may be implemented on an FPGA, and the redundant processor cores may be configured to swap out different coprocessing modules using Partial Reconfiguration (PR) to perform data processing algorithms using hardware acceleration. Embodiments of the fault-tolerant computer system may be utilized in radiation intensive environments, such as in outer space.

8 Claims, 8 Drawing Sheets

(56) References Cited

U.S. PATENT DOCUMENTS

| | | | |
|---|---|---|---|
| 12,050,688 | B1 | 7/2024 | LaMeres et al. |
| 2004/0199813 | A1 | 10/2004 | Hillman et al. |
| 2005/0005203 | A1 | 1/2005 | Czajkowski |
| 2006/0129897 | A1 | 6/2006 | Gomyo |
| 2008/0320340 | A1* | 12/2008 | Weiberle ............. G06F 11/1641 |
| | | | 714/E11.002 |
| 2017/0024268 | A1 | 1/2017 | Kimura et al. |
| 2019/0287607 | A1 | 9/2019 | Koladi et al. |
| 2020/0034262 | A1* | 1/2020 | Bemanian ........... G06F 11/2242 |

OTHER PUBLICATIONS

Label, K. A., "Radiation Effects on Electronics 101: Simple Concepts and New Challenges", NASA Electronics Parts and Packaging (NEPP), 2005.

Arora, R., et al., "Impact of Technology Scaling in sub-100 nm nMOSFETs on TID Radiation Response and Hot-Carrier Reliability," IEEE Trans. on Nuc. Science, vol. 61, No. 3, Jun. 2014.

Zhang, C., et al., "Total ionizing dose effects on analog performance of 28 nm bulk MOSFETs," 47th European Solid-State Device Research Conference (ESSDERC), Leuven, 2017, pp. 30-33.

Berg, M., et al., "Taming the SEU Beast—Approaches and Results for FPGA Devices and How to Apply Them," NASA Electronic Parts & Packaging Program Workshop, Paper 5, Jun. 2011.

NASA Space Technology Mission Directorate, Strategic Framework—EXPLORE: Advanced Avionics, Aug. 17, 2023, [Online]: https://techport.nasa.gov/file/144877—this website is not available anymore.

McKeefry, H.L., "RISC-V Eases Innovation in Military/Aerospace Designs", EE Times—Military and Aerospace Design Lines, Feb. 15, 2019.

Hogan, J., Weber, R., LaMeres, B., "Reliability Analysis of Field-Programmable Gate-Array-Based Space Computer Architectures", Jnl of Aerospace Info. Systems, vol. 14, No. 4, Apr. 2017.

NASA SBIR Phase I Fiscal Year 2023 Solicitation.

NASA Press Release, "NASA Awards Next-Generation Spaceflight Computing Processor Contract", Release 22-087, Aug. 15, 2022.

2020 NASA Technology Taxonomy—TX02: Flight Computing and Avionics.

Seely, J., Erusalagandi, S., & Bethurem, J., "MicroBlaze Soft Processor: Flexibility & Performance for Cost-Sensitive Embedded Designs", Xilinx, WP501 (v1.0), Apr. 13, 2017.

Haddad, N.F., et al., "2nd gen (200MHz) RAD750 microprocessor radiation evaluation", Radiation and Its Effects on Components and Systems (RADECS), European Conf, Sep. 2011.

Keys, A.S., "Technology Developments in Radiation-Hardened Electronics for Space Environments", NASA NTRS Document No. 20080032798, Jun. 2008.

NASA State-of-the-Art Spacecraft Technology, Small spacecraft Systems Virtual Institute, ARC, Doc No. NASA/TP—2022-0018058, Jan. 2023.

Butler, R.W., "A Primer on Architectural Level Fault Tolerance", NASA Scientific and Technical Information (STI) Program Office, Report No. NASA/TM-2008-215108, Feb. 2008.

Petrick, D., Espinosa, D., Ripley, R., Crum, G., Geist. A. and Flatley. T., "Adapting the reconfigurable spacecube processing system for multiple mission applications," IEEE Aerospace Conference, Big Sky, MT, USA, 2014, pp. 1-20, doi: 10.1109/AERO.2014.6836227.

"2022 Global Space Economy at a Glance." Sep. 29, 2023. BryceTech website: https://brycetech.com/reports.

"Space On-board Computing Platform Market Definition and Segments." Jan. 2024. The Business Research Company website: https://www.thebusinessresearchcompany.com/report/space-on-board-computing-platformglobal-market-report.

"Smallsats by the Numbers 2023." Aug. 22, 2023. BryceTech website: https://brycetech.com/reports.

"UCS Satellite Database." May 1, 2023. Union of Concerned Scientists website: https://www.ucsusa.org/resources/satellite-database.

Erwin, Sandra. "Industry report: Demand for satellites is rising but not skyrocketing." Dec. 4, 2023. SpaceNews website: https://spacenews.com/industry-report-demand-forsatellites-is-rising-but-not-skyrocketing/.

BISH Research, "Space-Based Edge Computing Industry and Technology Overview." 2023. BIS Research website: https://bisresearch.com/industry-report/space-based-edge-computing-market.html.

Doyle, T.P., "NASA Nurtures Promising Tech Ideas from Small Businesses," NASA Headquarters, NASA Press Release No. 24-059, dated Apr. 22, 2024, available at (https://www.nasa.gov/news-release/nasa-nurtures-promising-tech-ideas-from-small-businesses/ ), with abstracts published on Apr. 22, 2024 and available at: https://www.nasa.gov/wp-content/uploads/2024/01/2023-sbir-phase-ii-selections-4-22-24-1.pdf?emrc=6684342201f54.

Gahl, T. J., "Triplicated Instruction Set Randomization in Parallel Heterogenous Soft-Core Processors," A Thesis submitted in partial fulfillment of the requirements for the degree of Master of Science in Electrical Engineering, Montana State University, Bozeman, Montana, Apr. 2019.

KC, G.S. et al., "Countering Code-Injection Attacks With Instruction-Set Randomization," CCS '03: Proceedings of the 10th ACM conference on Computer and communications security Oct. 2003, pp. 272-280, https://doi.org/10.1145/948109.948146.

Major, C. M. et al., "RadPC: A Novel Single-Event Upset Mitigation Strategy for Field Programmable Gate Array-Based Space Computing," Journal of Aerospace Information Systems ( IF 1.5 ) , Pub date: Apr. 2, 2021; https://doi.org/10.2514/1.I010859.

Major, Chris Michel, "Novel Approach to Fault Tolerance in Space Computers Leveraging the RISC-V Architecture," Ph.D dissertation orally presented at Montana State University, Bozeman, Montana, in May 2023 (publication not available to the public as of Oct. 10, 2023).

NASA Strategic Plan 2022, Mar. 28, 2022. Available [Online]: https://www.nasa.gov/wpcontent/uploads/2023/09/fy-22-strategic-plan-1.pdf—Part 1.

NASA Strategic Plan 2022, Mar. 28, 2022. Available [Online]: https://www.nasa.gov/wpcontent/uploads/2023/09/fy-22-strategic-plan-1.pdf—Part 2.

Spacetech, "SpaceTech Industry Year Overview: 2021." Jan. 2022. SpaceTech website: https://www.spacetech.global/spacetech-industry-year-overview-2021.

Zuo, S. et al., "Hardware Based RISC-V Instruction Set Randomization," 2022 IEEE International Conference on Integrated Circuits, Technologies and Applications (ICTA), Xi'an, China, 2022, pp. 96-97, doi: 10.1109/ICTA56932.2022.9963094.

\* cited by examiner

FAULT-TOLERANT COMPUTER SYSTEM WITH CONFIGURABLE COPROCESSOR COMPONENT AND METHODS THEREOF

GOVERNMENT SUPPORT

This invention was made with Government support under Contract No. 80NSSC24CA100 awarded by National Aeronautics and Space Administration (NASA). The Government has certain rights in the invention.

FIELD

The present disclosure relates generally to computer systems having real-time configurable coprocessors and methods thereof.

BACKGROUND

Space exploration, as an industry, has grown rapidly over the past decade in part due to increasing interest and investment from the private sector. With increased demand for space exploration comes increased demand for aerospace hardware that can safely carry humans and equipment deep into space. There is a continuing need to improve the reliability, performance and cost-effectiveness of computer systems used for space-based and other high-radiation environment applications.

SUMMARY

According to an embodiment of the present disclosure, a computer system includes a plurality of processor cores configured to simultaneously execute identical sets of processor-executable instructions, and a coprocessor component including a data storage component, and a configurable logic region, where the plurality of processor cores are configured with processor-executable instructions to perform operations including configuring the configurable logic region of the coprocessor component with a first coprocessing module, and controlling the first coprocessing module to perform first processing operations on data located in the data storage component.

DETAILED DESCRIPTION

Figure 1:
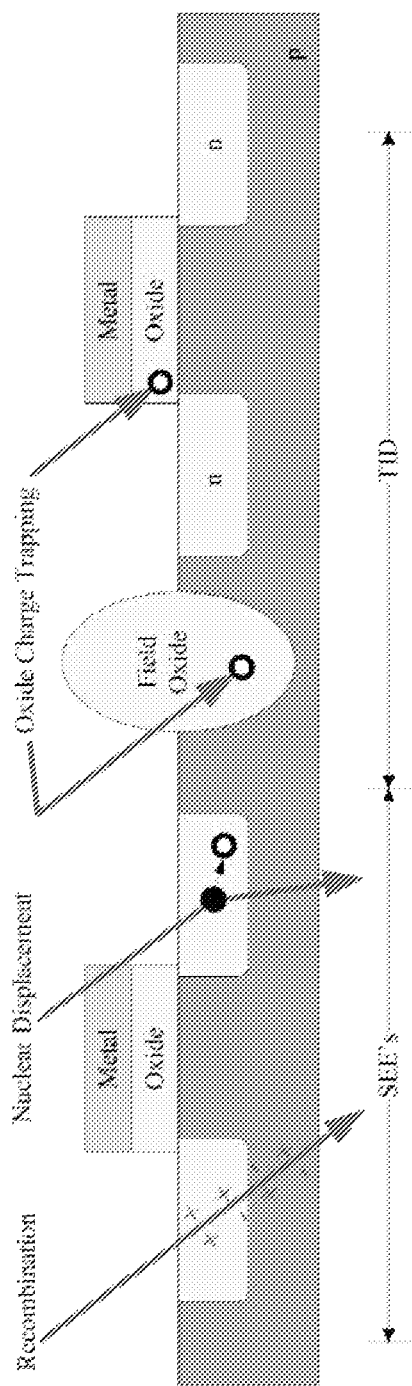
FIG. 1 is a side cross-section view of a typical semiconductor transistor illustrating how various radiation strikes cause different types of failures.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The present invention can "comprise" (open ended) or "consist essentially of" the components of the present invention as well as other ingredients or elements described herein. As used herein, "comprising" means the elements recited, or their equivalent in structure or function, plus any other element or elements which are not recited. The terms "having" and "including" are also to be construed as open ended unless the context suggests otherwise. As used herein, "consisting essentially of" means that the invention may include ingredients in addition to those recited in the description and/or claim, but only if the additional ingredients do not materially alter the basic and novel characteristics of the claimed invention.

Any and all ranges recited herein include the endpoints, including those that recite a range "between" two values. Terms such as "about," "generally," "substantially," "approximately" and the like are to be construed as modifying a term or value such that it is not an absolute, but does not read on the prior art. Such terms will be defined by the circumstances and the terms that they modify as those terms are understood by those of skill in the art. This includes, at very least, the degree of expected experimental error, technique error and instrument error for a given technique used to measure a value. Unless otherwise indicated, as used herein, "a" and "an" include the plural, such that, e.g., "a medium" can mean at least one medium, as well as a plurality of mediums, i.e., more than one medium.

Where used herein, the term "and/or" when used in a list of two or more items means that any one of the listed characteristics can be present, or any combination of two or more of the listed characteristics can be present. For example, if a composition of the instant invention is described as containing characteristics A, B, and/or C, the composition can contain A feature alone; B alone; C alone; A and B in combination; A and C in combination; B and C in combination; or A, B, and C in combination.

Various embodiments of the present disclosure are directed to fault-tolerant computer systems including reconfigurable hardware coprocessors that may provide improved computation capabilities and efficient resource usage. The fault-tolerant computing systems according to various embodiments may be utilized in high-radiation environments, such as in space applications.

A fault-tolerant computer system according to various embodiments may be implemented using one or more Commercial Off-the-Shelf (COTS) processors, such as a Field Programmable Gate Array (FPGA) that implements a set of fault-mitigation strategies that detect and mitigate single event effect (SEE) failure conditions resulting from ionizing radiation. In various embodiments, the computer system may utilize a RISC-V CPU and may additionally support a coprocessor component as a peripheral to increase computation through hardware acceleration. In some embodiments, the coprocessor component of the computing system may be implemented as a reconfigurable digital logic region or block on the same processor device (e.g., an FPGA) that contains the CPU. The reconfigurable logic region may be dynamically reconfigured (i.e., swapped) to implement different hardware functions. In some embodiments, the reconfigurable logic region may be dynamically reconfigured using Partial Reconfiguration (PR). This may provide more efficient use of hardware resources, enabling larger algorithms to be partitioned to fit on smaller FPGA devices in addition to seamlessly integrating hardware acceleration into a fault-tolerant computer architecture. In some embodiments, a dynamically reconfigurable coprocessor block may implement one or more image processing algorithms on image data, including live camera data. In some embodiments, a fault-tolerant computing system including a configurable coprocessor component may be implemented as a low-power embedded computer that may be located within an instrument or sub-system. In some embodiments, a fault-tolerant computing system including a configurable coprocessor component may be implemented within or as a companion to a high-performance computing system, such as NASA's High Performance Space Computer (HPSC) system. The fault-tolerant computing system with a configurable coprocessor component may be in the form of a coprocessor card that may be connected to the same backplane as the HPSC system, for example.

Computers operating in harsh radiation environments, such as experienced in outer space, are subject to multiple types of failures. Radiation effects are separated into two broad categories: Total Ionizing Dose (TID) and Single Event Effects (SEE). Each of these failure mechanisms is caused by ionizing radiation striking the integrated circuit (IC) substrate and depositing unwanted energy. TID failure is caused by lower energy protons and electrons (<30 MeV/amu) striking the substrate and creating electron/hole pairs that are trapped in the insulating materials of the electronic devices. When this trapped charge occurs in the gate oxide of a transistor it causes the threshold voltage to be altered, which puts the device into a state where it is either always on or always off. When this trapped charge occurs in the isolation regions between devices, it can cause leakage current that consumes excessive power and can ultimately destroy the device. TID exposure causes a gradual degradation of the part as opposed to instantaneous failure. Space-grade parts are given a rating of rad, or how much TID they can withstand before their material is damaged and the device is no longer operational. A part is typically considered radiation-hardened when it has a TID ratings between 300 krad and 1 Mrad, although most NASA missions (>90%) have historically only required a >100 krad TID rating.

SEE faults refer to electron/hole pairs caused by high energy charged particles and heavy ions striking the diffusion regions of a device. SEEs do not necessarily cause permanent damage to the device like TID does, but they do cause unwanted logic-level transitions. These unwanted transitions lead to system failures such as erratic computer behavior or full system crashes. When a high-energy particle passes through an integrated circuit and generates enough free charge to change the state of a digital logic line, it is called a single event transient (SET). If this voltage transient is captured and stored by a register or other memory device, the event is referred to as a single event upset (SEU). It is generally possible to recover from an SEU by simply resetting the affected circuit; however, if the SEU produces such an alteration that a reset alone is not sufficient to restore the device to a healthy state, it is called a single event functional interrupt (SEFI). SEFIs typically require more drastic recovery measures such as power cycling or full system re-initialization. FIG. 1 is a side cross-section view of a typical semiconductor transistor illustrating how various radiation strikes cause different types of failures.

Historically, the feature sizes of ICs used in space computers were such that TID was the primary radiation concern. Larger devices had thick oxide insulators that were highly susceptible to charge trapping because of their relatively large volumes within the device. Simultaneously, the diffusion regions of older devices were large enough that a high-energy particle strike did not cause sufficient energy to change the state of a logic gate. This was because the radiation particle sizes were relatively small compared to the diffusion region volume, and a strike could not create enough free charge to change the state of the device. In modern ICs (e.g., <65 nm process node), the feature sizes have been reduced to the point where TID is no longer the dominating failure mechanism. This is because the oxide thickness of the devices is so thin that the statistical probability of charge getting trapped is minimal. Thus, modern ICs are becoming inherently tolerant to TID. For example, modern ICs are achieving TID tolerance levels of >100 krad when implemented in the 65 nm process node and as much as 300 krad when implemented in a 28 nm node. These levels are allowing modern COTS parts to have rad-hard performance with respect to TID. However, as TID immunity is increased with each subsequent process node, so is the susceptibility to SEEs. In modern devices, faults caused by SEEs are now the leading concern for many space computing applications, such as low earth orbit (LEO) and/or cislunar missions. This is because the diffusion regions of modern devices have been reduced in size to the point where even a minimal amount of charge displaced by a radiation strike is sufficient to cause a SEE.

The aerospace industry has devised hardening techniques to reduce the resulting ionization in semiconductor materials from radiation strikes. One technique is radiation hardened by process (RHBP) in which the materials used to implement the ICs are physically altered. Approaches such as using a Silicon-on-Insulator (SOI) substrate will reduce the amount of charge created upon a radiation strike by reducing the physical distance that the radiation traverses in the semiconductor material. Another approach used in RHBP is doping the insulators in the semiconductor to make them more conductive to avoid charge building up and getting trapped. A different approach to harden ICs is radiation hardened by design (RHBD). In RHBD, custom layout practices such as enclosed layout transistors (ELTs) and guard rings are used to reduce the impact of radiation strikes on the active circuitry.

While both RHBP and RHBD are effective in increasing TID tolerance and reducing susceptibility to SEEs in space electronics, they suffer from two main disadvantages that motivate moving toward new radiation mitigation approaches in space computers. The first disadvantage is cost. Any time a custom processing approach is used in semiconducting manufacturing, the volume is decreased relative to an equivalent commercial part. This reduced volume leads to a significant increase in the price-per-unit because the initial cost of setting up the fabrication process cannot be amortized over a large enough volume of units. Current radiation hardened computers can cost between $100 k to $200 k, making them suitable only for expensive missions such as Class A/B payloads or in classified military applications. The second disadvantage to current hardening techniques is performance. The techniques used to harden ICs typically lead to increased circuit size and suboptimal material behavior. This in turn leads to diminished performance and increased power consumption compared to commercially equivalent parts.

The NASA Space Technology Mission Directorate (STMD) has created a Strategic Framework that details the computing requirements for future missions. The Advanced Avionics Systems outcome of this framework specifically calls for "next generation high performance computing" technology that delivers a "100× increase in computational capacity for the same power utilization of current space-based processors." It further states that radiation tolerance and fault tolerance are qualities that should be available in any commercial computing solution. Simultaneous to the technical needs from the NASA strategic framework are calls by the 2022 NASA Strategic Plan for STMD to invest in technologies that can reduce cost of future missions to support the growth of the commercial space industry.

Various embodiments of the present disclosure may enable increased computation and reduced power in small spacecraft to enable in-space processing of advanced algorithms such as machine learning (ML), artificial intelligence (AI), and signal processing. In addition, various embodiments of the present disclosure may address the need for fault tolerance in space computers operating in harsh radiation environments that are increasingly susceptible to SEEs. Various embodiments may contribute to lower costs of computing technology in small spacecraft to enable broader participation in the commercial space ecosystem.

Computing systems including reconfigurable hardware coprocessors according to various embodiments may meet these needs by providing fault-tolerance capabilities, optimal hardware resource usage, and usability for the end-user. In some embodiments, the computing system may utilize a fault-tolerant, RISC-V based embedded edge computer that may function as a controller for a coprocessor block that may provide hardware accelerator capabilities. The system may be implemented on a COTS FPGA, which may provide the ability to swap coprocessors in real time. Modern COTS process nodes have relatively high TID tolerance levels (e.g., ≥100 krad) due to their thin insulation regions which reduce the probability of charge trapping. Thus, the primary barrier to successful implementation of FPGA-based computers and hardware accelerators for use in space is an aggressive SEU mitigation strategy.

A fault-tolerant computing system according to various embodiments may utilize an architectural approach to mitigating SEEs that may be automated and abstracted from the software developer. In some embodiments, a first SEE fault mitigation strategy used in the embodiment computing systems may include the use of redundant processor cores. For example, majority voters may be provided on registers of the redundant processor cores. If a fault is detected in one of the registers, the system clock is halted while the faulted register(s) may be loaded with the value from the majority vote. In embodiments in which the redundant processor cores are implemented using a RISC-V architecture, this fault detection and repair may be accomplished in two clock cycles due to the architecture of the RISC-V (i.e., one instruction per clock cycle). This vote/repair approach is an extension of the fault mitigation approach used in related computing systems known as "triple modular redundancy" (TMR) in which three redundant circuits feed their outputs into a majority voter. Various embodiments of the present disclosure may extend TMR by adding a fourth input into the voter (i.e., "quad modular redundancy" or QMR) to increase reliability. If the rapid vote/repair approach described above does not fix the fault, a partial reconfiguration (PR) may be initiated on the impacted CPU while the rest of the processor cores are allowed to continue foreground operation. PR is a more comprehensive repair procedure because it will flush out any SEE-induced errors that occurred in the foreground circuitry and/or within the configuration memory corresponding to the CPU's location on the FPGA. Once the faulted CPU is repaired via PR, it is then reintroduced into the system. Using the rapid vote/repair procedure, the repaired CPU can be synchronized to the other computers within 2 clock cycles. PR of a redundant CPU may be accomplished in ~60 ms using the fastest configuration prototype; however, since it is performed in the background while the healthy cores continue foreground operation, it does not significantly reduce the computer's availability. The use of four redundant CPUs also allows the system to recover from a second fault in a healthy CPU while the first fault is being repaired because at least two of the four CPUs will still have the same value. In some embodiments, a majority in the QMR computing system may be defined as at least 2 of the 4 CPUs having the same result that forms a majority of the available outputs. A QMR system with background PR repair may be significantly more reliable than a TMR system because a faulted CPU can be repaired in the background while maintaining enough CPUs working in the foreground to withstand a second fault, whereas a second fault in a TMR system leads to complete failure. A similar benefit may be obtained utilizing more than four redundant CPUs, although the advantage of more CPUs beyond four may result in diminishing returns in reliability due to the additional susceptible circuit area on the FPGA.

Various embodiments may also utilize a memory monitor as an SEE fault mitigation strategy. Because the instruction and data memories of the CPU are typically implemented using either on-chip SRAM or off-chip non-volatile memory, they cannot be restored to a healthy state using PR. It may also be impractical to place a voter on each word within the memory array due to the size of the memory. As such, a memory monitor may be used that continually moves through each location of the redundant, dual-port memories of each CPU and checks that the four values are identical. If one of the memory values is different, the monitor may overwrite the faulted memory location with the majority vote. In some embodiments, this repair procedure takes 2 clock cycles once the fault is discovered. Since the exact location of a memory fault cannot be determined until the monitor reaches its location, the detection of the fault can take between 1 and $2^n$ clock cycles, where "n" is the number of address locations being used within the memory array. While it is possible that in the worst case a memory fault will not be detected and repaired for $2^n$ clock cycles, any fault that occurs in memory that makes its way into the CPU will be detected and repaired in 2 clock cycles using the register vote/repair procedure described previously. This memory monitor approach may be similar to memory scrubbing, in which the foreground memory is continually compared to a "golden" copy stored in a separate location. However, the memory monitor according to various embodiments may differ from traditional scrubbing in that it uses the quad redundant memories to determine the correct result instead of a separate golden copy. This may allow the memory monitor to be used on both instruction and data memory as data memory continually changes and thus it is not practical or possible to maintain a "golden" copy. Various embodiments may implement separate monitors for instruction and data memory and in some cases may have its search range adjusted in real-time such that only locations in memory that are actually in use may be monitored used as opposed to monitoring the entire array.

Various embodiments may also utilize a configuration memory monitor as an SEE mitigation strategy. In a computing system implemented on one or more FPGAs, the configuration memory may hold the settings for the FPGA to implement the user's design. Modern FPGAs have error correction codes (ECCs) on each location in configuration memory, which can compensate for single-bit and double-bit adjacent faults. This may give the configuration memory some level of inherent SEE immunity. However, additional monitoring may provide additional fault-tolerance because faults in the configuration memory will accumulate over time and may eventually result in too many faults for the ECCs to compensate for. In various embodiments, a soft error monitor (SEM) may be used on the configuration memory of the FPGA. The SEM may continually scan each location in the configuration memory looking for a fault. As the SEM scans each location in memory, it may determine if ECCs have been used to compensate for faults, and if so, it may restore the memory and ECC codes to their original values.

Figure 2:
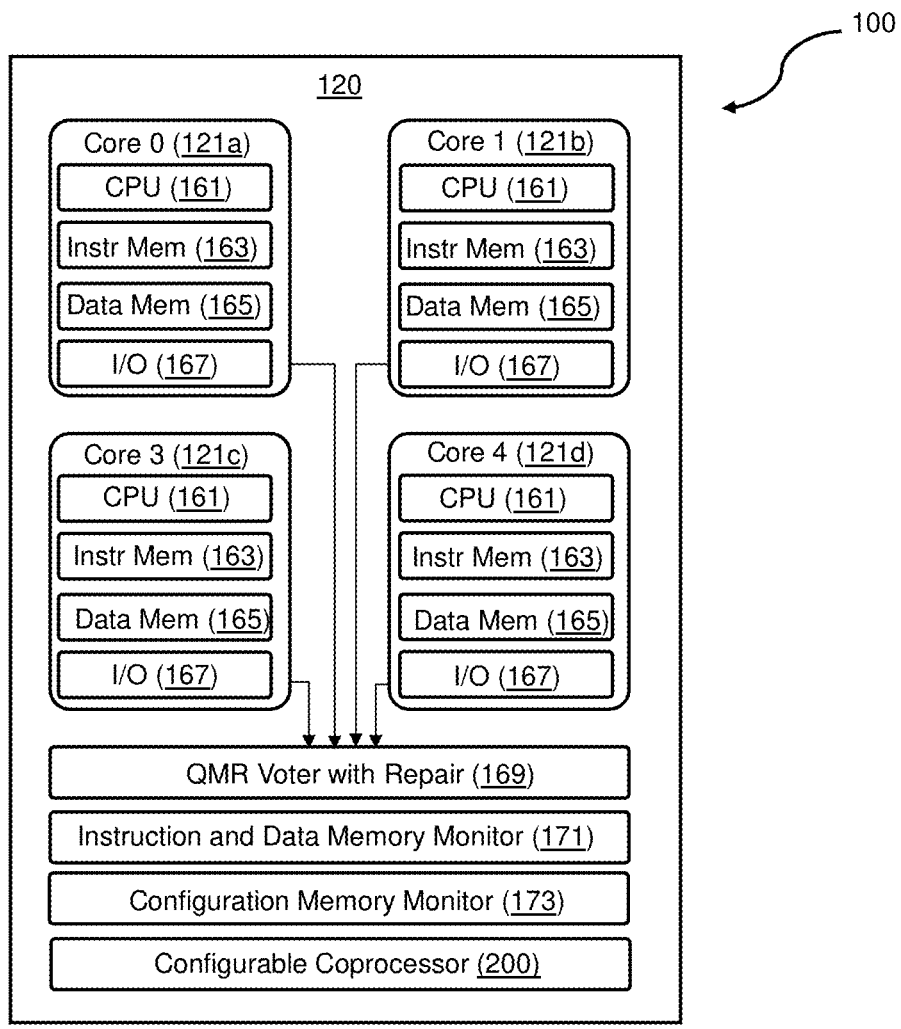
FIG. 2 is a system block diagram schematically illustrating a fault-tolerant computer system for mitigating the effects of radiation in space or other high-radiation environments according to various embodiments of the present disclosure.

FIG. 2 is a system block diagram schematically illustrating a fault-tolerant computer system 100 for mitigating the effects of radiation in space or other high-radiation environments according to various embodiments of the present disclosure. Referring to FIG. 2, the computer system 100 may include a processing component 120 including a plurality of redundant processor cores 121a, 121b, 121c and 121d. The processor cores 121a, 121b, 121c and 121d may be functionally identical to one another. At any given time, each processor core 121a, 121b, 121c may execute the same instruction and may operate as a single computing node for the user. The processor cores 121a, 121b, 121c and 121d may thus provide quad modular redundancy (QMR) as described above.

In various embodiments, the processing component 120 including the redundant processor cores 121a, 121b, 121c and 121d may be implemented using an FPGA. FPGAs are digital logic devices that can be configured into any desired computational architecture. They are a well-established technology with commercial off-the-shelf (COTS) availability, competitive pricing, and extensively-supported design and development environments. An FPGA can implement a computing system with extra features not available with commercial microcontrollers, including error-checking mechanisms for computational performance. FPGAs can also offer performance increases through parallelism.

It can also be relatively straightforward to implement logic redundancy on an FPGA by reusing pre-defined modules of logic circuitry. Thus, FPGAs may be used as a means of establishing redundancy. Most importantly, FPGAs can be reconfigured as needed when any portion of its logic is faulted or affected. This feature, known as Full Reconfiguration (FR) when all of the logic is fully reset to a known state, and Partial Reconfiguration (PR) when only a portion of the logic is reset, can be used as a means of self-repair in response to a failure mode.

A logic circuit may be designed in an FPGA using a hardware description language (HDL) and a dedicated synthesis tool to convert the described circuitry into real-time logic (RTL) that the FPGA can run. Popular HDLs include VHDL and Verilog. The synthesis tool also allows a developer to configure timing, logic placement and routing, and generate output files (such as bitstreams) to be deployed onto an FPGA during regular operations. Some synthesis tools even allow for live debugging of an FPGA's internal logic.

Referring again to FIG. 2, each of the redundant processor cores 121a, 121b, 121c and 121d of the processing component 120 may include a CPU 161, an associated instruction memory 163, an associated data memory 165, and an input/output component 167. In various embodiments, each of the CPUs 161 may be a softcore processor utilizing an open source instruction set architecture (ISA). In some embodiments, the softcore processors 161 may include custom-built RISC-V softcore processors.

The RISC-V processor architecture has gained popularity over the last few years, having developed an accessible ecosystem for implementation and use in digital systems. The open-source Instruction Set Architecture (ISA) supports several different types of processor cores, allowing 32-bit, 64-bit, and even 128-bit configurations. Multiple versions of complete instruction sets are offered, ranging from basic integer operations to floating-point calculations and more. The most basic functional RISC-V variant is the RV32I, with 40 instructions necessary to run any basic C program. The RISC-V ISA has been adopted into a wide variety research and technologies, with several examples of RISC-V softcore processors being integrated into FPGA designs. However, it will be understood that various embodiments may utilize other processor architectures, such as ARM processors, SPARC processors, RISC-x processors, and the like.

Referring again to FIG. 2, the processor component 120 of the computing device 100 may include a voting and repair component 169 that may be configured to route a "correct" majority value from four inputs (i.e., one from each redundant processor core 121a, 121b, 121c and 121d) while also identifying and correcting any compromised inputs. In some embodiments, the voting component 169 may include a combinational logic circuit to limit the time it takes to evaluate component outputs.

In various embodiments, the voting and repair component 169 may be provided with backdoor access to critical areas of operation during runtime of the computing system 100, such as the registers, program counters, and/or peripheral devices. In the case of the registers, for example, each of the redundant processor cores 121a, 121b, 121c and 121d may provide backdoor access to each register of the respective processor core to the voting and repair component 169. The voting and repair component 169 may be configured to vote on the correct register values and to overwrite bad data in each of the registers of the redundant processor cores 121a, 121b, 121c and 121d. In various embodiments, the voting and repair component 169 may check each of the registers of the processor cores 121a, 121b, 121c and 121d, determine which values are erroneous, and correct the faulty register values within a single instruction cycle of operation of the computing system 100. In some embodiments, voting may be performed by instantiating multiple voting subcomponents within the voting and repair component 169 that may each evaluate the same register across all four redundant processor cores 121a, 121b, 121c and 121d. When a voter subcomponent detects an incorrect value through its majority selection, it may raise a flag that signals the voting and repair component 169 to enable a write to the affected processing core and refresh the faulty register value(s) with the majority value.

The program counters (PCs) of the processor cores 121a, 121b, 121c and 121d are also technically registers, although they cannot be directly accessed as in the case of the other register components. As this "register" is essential to synchronizing each processor core 121a, 121b, 121c and 121d, it may be refreshed along with all other registers whenever the voting and repair component 169 demands a write. This ensures that, for any given instruction, the voting and repair component 169 can guarantee that all voted register values correspond to the same instruction and do not reflect different states of program execution. It also "freezes" the instruction momentarily, ensuring that the registers cannot be affected by a processor operation but only by a write operation initiated by the voting and repair component 169.

In some embodiments, the voting and repair component 169 may additionally include an additional voting subcomponent that may monitor and regulate outputs to peripheral devices of the computer system 100, such as general purpose input output (GPIO) ports or serial communication devices.

In some embodiments, in cases in which the rapid vote/repair approach described above is unable to correct a fault condition in a particular processor core 121a, 121b, 121c and 121d, a partial reconfiguration (PR) process may be initiated. The PR process may include reconfiguring portions of the affected processor core 121a, 121b, 121c and 121d, such as the CPU 161 and/or the memory management unit (MMU) of the core, back to a known good state. The remaining processor cores 121a, 121b, 121c and 121d may continue operating while the faulty processor core undergoes the PR process.

Further details of a fault-tolerant computing system with redundant processor cores are described in U.S. Pat. No. 11,966,284 to Lameres et al., which is incorporated by reference herein for all purposes. Although FIG. 2 illustrates an example of a QMR-based computer system having four redundant processor cores 121a, 121b, 121c and 121d, it will be understood that the computer system 100 may have any number (e.g., ≥2) of redundant processor cores. Further, although the embodiment of FIG. 2 illustrates a voting and repair component 169 that is configured to monitor and overwrite critical areas of operation of the redundant processor cures during runtime of the computer system 100, it will be understood that other types of voting mechanisms, such as a software checkpoint-based voting mechanism, may also be utilized.

Referring again to FIG. 2, the processing component 120 of the computing system 100 may also include an instruction and data memory monitor 171. The instruction and data memory monitor 171 may be used to mitigate errors in the both the instruction memory 163 and the data memory 165 of each of the redundant processor cores 121a, 121b, 121c and 121d. The processor cores 121a, 121b, 121c and 121d may provide byte wise access to the instruction memory 163 and the data memory 165 of each core. The instruction and data memory monitor 171 may operate as a background process iteratively accessing each memory address in the instruction memory 163 and the data memory 165 of processor core 121a, 121b, 121c and 121d. The instruction and data memory monitor 171 may iterate through the instruction memory 163 and the data memory 165 in lockstep, accessing the same address in each of the respective processor cores 121a, 121b, 121c and 121d simultaneously (e.g., through backdoor access ports to the instruction memory 163 and the data memory 165). Where the instruction memory 163 and the data memory 165 are byte-wise addressable, the instruction and data memory monitor 171 may read full (e.g., 32-bit) words at a time according to various embodiments. The instruction and data memory monitor 171 may further include a voting subcomponent that may be configured to read and compare the contents of each memory address across all four processor cores 121a, 121b, 121c and 121d of the computer system 100. In the case of a voting disagreement, the instruction and data memory monitor 171 may enable a write operation to write the correct (i.e., majority value) data to the appropriate address. In some embodiments, a single memory monitor 171 may iteratively check all of the memory addresses of the local memories, including the instruction memory 163 and the data memory 165 of the redundant processor cores 121a, 121b, 121c and 121d. Alternatively, multiple memory monitors may operate simultaneously to check the memory addresses, such as a first monitor that checks the local instruction memory 163, and a second monitor that checks the local data memory 165.

Referring again to FIG. 2, the processing component 120 of the computer system 100 may further include a configuration memory monitor 173. In some embodiments, the configuration memory monitor 173 may include a soft error monitor (SEM) as described above. An FPGA's real-time logic (RTL) is determined by its configuration memory, which holds the settings for the FPGA required to implement a design. Many FPGAs have error correction codes (ECCs) within each configuration memory location that can allow for detection and correction of single-bit and double-bit adjacent faults. These codes are a series of flag bits that can be checked against the data in the memory location and help determine if any bits have flipped. A component external to or within the FPGA can read these codes and, in the event of an upset, correct the flipped bit. Monitoring of the configuration memory may be important to prevent multiple bits from accumulating over time, as large numbers of upset configuration memory locations will inevitably compromise the design. In various embodiments, the configuration memory monitor 173 (e.g., SEM) may continually scan each location in the configuration memory looking for a fault. As the configuration memory monitor 173 scans each location in memory, it may determine if ECCs have been used to compensate for faults, and if so, it may restore the memory and ECC codes to their original values.

Referring again to FIG. 2, the processing component 120 of the computer system 100 may additionally include a configurable coprocessor component 200. The configurable coprocessor component 200 may provide hardware accelerator functionality in various embodiments. In some embodiments, the configurable coprocessor component 200 may be implemented in a dedicated region or block of an FPGA. In various embodiments, the entire processing component 120, including the redundant processor cores 121a, 121b, 121c and 121d, the voting and repair component 169, the instruction and data monitoring component 171, the configuration memory monitoring component 173, and the configurable coprocessor component 200, may be implemented on a common FPGA. FPGAs may be well-suited to implement hardware accelerator circuitry due to their massive parallel resources. FPGAs may also be well-suited at implementing AI/ML processing of real-time data since AI and/or ML algorithms typically rely heavily on matrix operations that may be readily implemented using FPGA hardware. One of the challenges of implementing hardware accelerators within a computer system is the latency of data movement between the CPU and the accelerator circuitry. In various embodiments described in further detail below, the configurable coprocessor component 200 may include its own dedicated data storage component such that the original data set (e.g., incoming data stream) that is processed by the configurable coprocessor component 200 does not need to be transmitted to or saved by the redundant processor cores 121a, 121b, 121c and 121d. The configurable coprocessor component 200 may receive the incoming data stream (e.g., from a sensor, camera or other device) and compute the desired outputs (e.g., artifacts) from the incoming data, which may be provided to the processor cores 121a, 121b, 121c and 121d. The original data may then be discarded. This may enable only relevant information to be extracted from the incoming data stream without needing to store massive amounts of unnecessary data.

In various embodiments, software executed on the redundant processor cores 121a, 121b, 121c and 121d may control operation of the coprocessor component 200, including configuration/set up of the coprocessor component 200, the start and stop of processing operations (e.g., computations), and triggering reconfiguration of the coprocessor component 200. The redundant processor cores 121a, 121b, 121c and 121d may also monitor the status of the coprocessor component 200. In various embodiments, the coprocessor component 200 may be memory mapped as a peripheral to the redundant processor cores 121a, 121b, 121c and 121d. The memory mapping may provide the redundant processor cores 121a, 121b, 121c and 121d with access to the data outputs (e.g., artifacts) from the coprocessor component 200 as well as to registers for configuring and monitoring status of the computation. This architecture may minimize data movement between the processor cores 121a, 121b, 121c and 121d and the coprocessor component 200. In various embodiments, signals transmitted from the redundant processor cores 121a, 121b, 121c and 121d to the coprocessor component 200 may pass through a voting subcomponent (e.g., a combinational logic voter) of the voting and repair component 169. Signals coming out of the coprocessor component 200 may be fanned out to each of the four redundant processor cores 121a, 121b, 121c and 121d.

As discussed above, the configurable coprocessor component 200 may be implemented in a dedicated region or block of an FPGA. Many algorithms that are commonly implemented using hardware accelerator coprocessing may not fit within a single FPGA. However, these algorithms are frequently well suited for partitioning into a sequence of steps. Various embodiments may leverage the above-described partial reconfiguration (PR) capability of FPGAs to partition hardware accelerator circuitry into separate functional coprocessor processing modules. Software running on the redundant processor cores 121a, 121b, 121c and 121d may dynamically swap the different processing modules into and out of the coprocessor component 200 of the FPGA using PR. This may allow algorithms that cannot by themselves fit within an FPGA device to be divided into smaller parts that can be.

Figure 3:
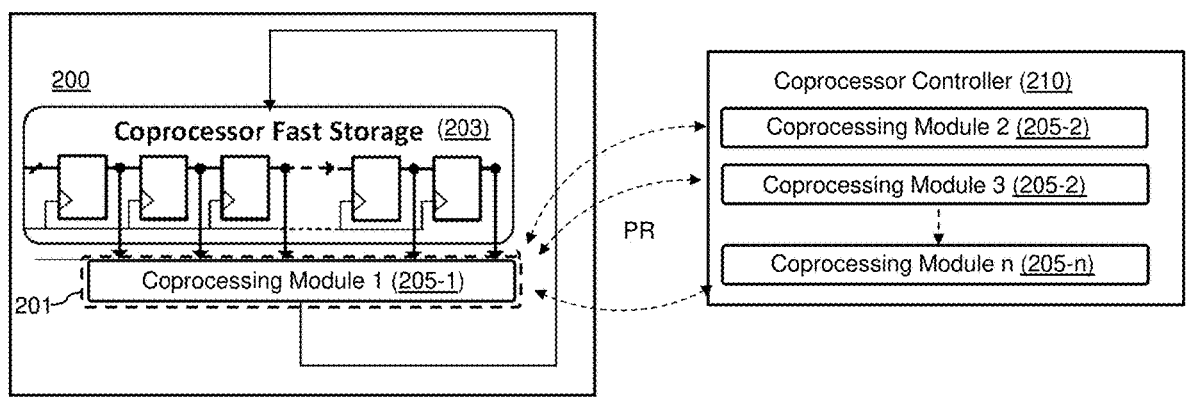
FIG. 3 is a block diagram schematically illustrating a coprocessor component 200 according to various embodiments of the present disclosure.

FIG. 3 is a block diagram schematically illustrating a coprocessor component 200 according to various embodiments of the present disclosure. Referring to FIG. 3, as discussed above, coprocessor component 200 may include a processing region 201 or block of an FPGA. The processing region 201 may be a digital logic region of the FPGA that may be subject to Partial Reconfiguration (PR). A coprocessor controller 210 may initially configure the processing region 201 with a first coprocessing module 205-1. In some embodiments, the first coprocessing module 205-1 may include a first portion or step of a larger data processing algorithm. As discussed above, the functions of the coprocessor controller 210 may be performed by, or under the control of, the redundant processing cores 121a, 121b, 121c and 121d of the processing component 120 of the computer system 100. The coprocessor component 200 may also include a data storage component 203. In some embodiments, the data storage component 203 may include one or more fast storage registers having a first-in, first-out (FIFO) structure. The data storage component 203 of the coprocessor component 200 may enable large amounts of input data to be streamed to the coprocessor component 200 without needing to store the original data in the CPU's memory. Instead, only pertinent information (i.e., artifacts) obtained from the streaming data may need to be stored in the CPU's memory. By not saving the incoming data in a traditional RAM, the latency involved in storing blocks of fast incoming data and then later retrieving the same information for processing by the CPU may be avoided. Streaming the incoming data through a register-based data storage component 203 may allow the data to be accessed directly by the processing module(s) 205 of the coprocessor component 200 to perform operations in hardware that is external to the CPUs 161 of the redundant processing cores 121a, 121b, 121c and 121d. In some embodiments, the register(s) of the data storage component 203 may be accessed by the processing module(s) 205 of the coprocessor component 200 in parallel.

In some embodiments, the coprocessor component 200 may include a single instance of the data storage component 203 (i.e., the coprocessor component 200 may not include redundant instances of the data storage component 203). Although register-based storage devices are susceptible to SEUs, they have the advantage that in a FIFO configuration, they will rapidly shift out any inadvertent bit-flips. In addition, infrequent SEUs in the incoming data stream are often inconsequential to the computation of the desired output data (i.e., artifacts). For example, for many imaging processing applications, such as filtering, edge detection, pattern recognition, etc., a single error/corrupted pixel in the incoming data stream is not likely to have a significant impact on the efficacy of the image processing algorithm. In other embodiments, the FIFO storage structure of the data storage component 203 may make it amenable to a redundant configuration including a voting component, such as a TMR configuration, assuming the FPGA has sufficient register resources.

Referring again to FIG. 3, the coprocessor controller 210 may be configured to initiate a PR process on the processing region 201 of the coprocessor component 200 that may enable dynamic reconfiguration of the coprocessor circuitry within the processing region 201 of the coprocessor component 200. In various embodiments, the PR process may include swapping out the first coprocessing module 205-1 with a different coprocessing module (e.g., 205-2, 205-2, . . . 205-n as shown in FIG. 3) that may be configured to perform different function(s) and/or processing operations than the first coprocessing module 205-1. In various embodiments, the different coprocessing module may include a separate portion or step of a larger data processing algorithm. Thus, by controlling the timing and sequence in which the different coprocessing modules are swapped out, the complete data processing algorithm may be performed by the coprocessor component 200.

In some embodiments, the coprocessor component 200 may include a single instance of the processing region 201 that may be reconfigured to implement the different coprocessing modules 205-1 through 205-n (i.e., the coprocessor component 200 may not include redundant instances of the processing region 201). The size of the processing region 201 may be at least as large as the largest coprocessing module of the various coprocessing modules 205-1 through 205-n. The single processing region 201 may be memory mapped to each of processing cores 121a, 121b, 121c and 121b through a voting mechanism so that each CPU may access it as a standard peripheral. This may enable the fastest PR time without de-synchronizing the CPUs. This may also allow the smallest PR bitstreams to be used, which may minimize the swap time of the different coprocessing modules 205-1 through 205-n. In embodiments in which the processing region 201 and the coprocessing modules 205-1 through 205-n implemented thereon are not redundant, they may be susceptible to SEUs. However, during normal operation, the rate at which the different coprocessing modules are switched out via PR may be faster than the incoming fault rate in many target environments for the computer system 100 (e.g., LEO, cislunar and/or lunar environments). Accordingly, the PR process may essentially provide a memory scrubbing function that prevents accumulation of SEU faults. In some embodiments, the processing region 201 may be configured with a blank or "dummy" configuration when the coprocessor component 200 is not in active use to prevent SEU faults from accumulating, which may further reduce the impact of SEUs.

Figure 4:
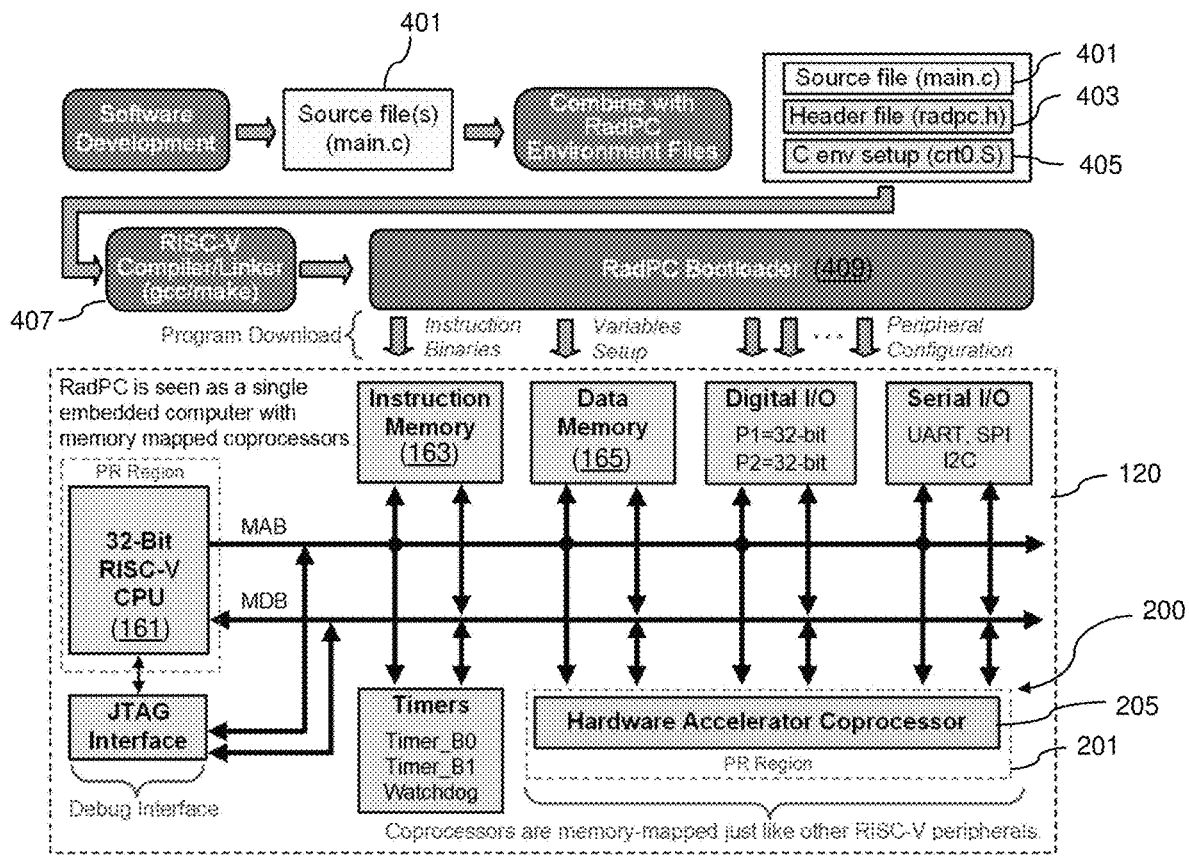
FIG. 4 is a block diagram schematically illustrating a programming model for a fault-tolerant computer system with a reconfigurable coprocessor component according to various embodiments of the present disclosure.

In various embodiments, the various fault mitigation strategies and coprocessor reconfiguration operations of the computer system 100 may be abstracted from the user. This abstraction may allow developers to create software for the fault-tolerant computer system 100 with a reconfigurable coprocessor component 200 as if it were any other embedded computer. FIG. 4 is a block diagram schematically illustrating a programming model for a fault-tolerant computer system 100 with a reconfigurable coprocessor component 200 according to various embodiments of the present disclosure. Software program(s) may be developed specifically for use by the computer system(s) 100, and/or may be existing commercial and/or open-source programs developed by independent third parties. The output of the software development process may be one or more source files 401, which may be written in suitable programming language(s) (e.g., C, assembly language, etc.). The source file(s) 401 may then be combined with additional files specific to the environment of the computer system 100. A standard header file 403 may provide the memory map, peripheral setup, and hardware accelerator control. A startup file 405 may initialize the runtime environment of the computer system 100. The combined file may then be compiled and linked using the RISC-V open source tools 407 to produce instruction binaries and memory assignments. A bootloader system 409 may be used to download the software into the processing component 120 of the computer system 100 that may reside on an FPGA. The bootloader system 409 may initialize the instruction memory 163 and the data memory 165 of each of the redundant processing cores 121a, 121b, 121c and 121d and may take the redundant CPUs 161 out of reset. The coprocessor component 200 may be memory mapped like other peripherals of the computer system 100. The computer system 100 may then execute the software program.

As mentioned above, NASA has described a goal of realizing a 100× increase in computational capability for the same power utilization of current space-based processors. To achieve this goal, the NASA Strategic Framework for advanced avionics envisions a computing ecosystem containing a spectrum of devices with varying performance and fault-tolerance. The workhorse of the proposed ecosystem will be a new radiation-hardened processor (currently called the HPSC) currently in development. It is envisioned that this new ultra-reliable processor will work in conjunction with coprocessor cards on the same backplane that achieve higher performance by exploiting reconfigurable fabrics with potentially less stringent reliability requirements compared to the HPSC. Also within this computing ecosystem will be distributed low-power embedded computers for instruments and subsystems that can perform data processing at the edge.

A fault-tolerant computer system 100 with a reconfigurable coprocessor component 200 according to various embodiments may contribute to this envisioned computing ecosystem in a variety of ways. First, the FPGA-based architecture of various embodiments of the computer system 100 may make it well-suited for implementation as a coprocessor card. The ability of this system 100 to bring on arbitrary hardware accelerator functions via an integrated coprocessor component 200 may provide the computing ecosystem a highly flexible platform for algorithm acceleration. Additionally, since the above-described fault-mitigation strategies of the embodiment computer system 100 are FPGA agnostic, they may be implemented on new FPGA devices to exploit the SWAP-C advances that may be realized in future process nodes. The embodiment computer system 100 may also be well-suited for use as a low power embedded computer in instruments and subsystems. The fault-tolerant architecture of the embodiment computer system 100 may provide higher reliability over COTS microcontrollers while the ability to implement targeted hardware acceleration may enable real-time data processing prior to sending results to the HPSC.

Figure 5:
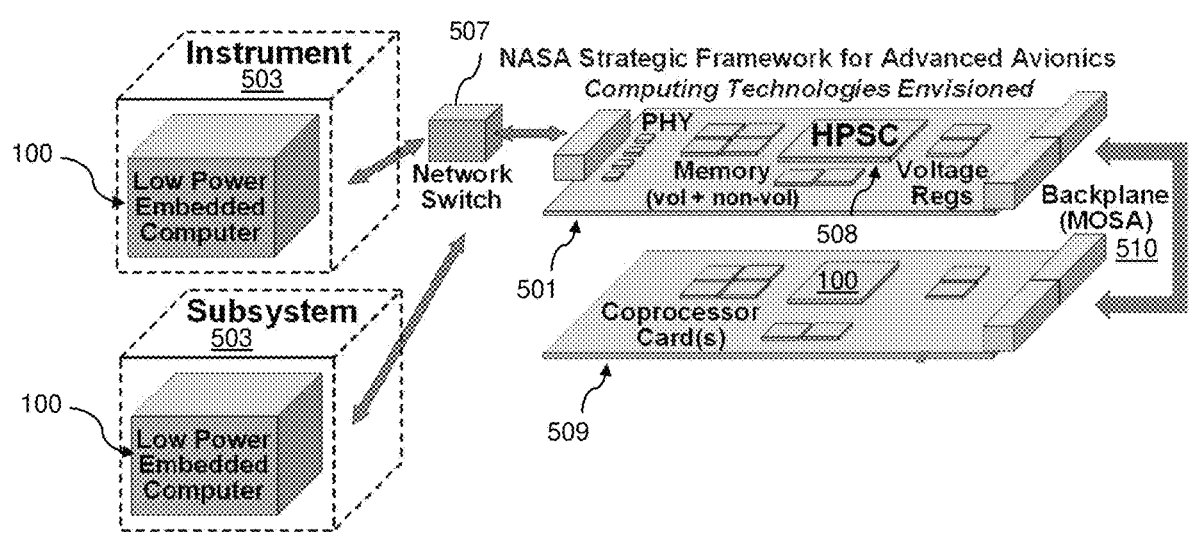
FIG. 5 schematically illustrates a space computing environment including an instrument and a subsystem connected to a high-power space computer via a network switch according to various embodiments of the present disclosure.

FIG. 5 schematically illustrates a space computing environment including an instrument 503 and a subsystem 505 connected to a high-power space computer 501 via a network switch 507 according to various embodiments of the present disclosure. The high-power space computer 501 may include a radiation-hardened processor 508 as described above and a coprocessor card 509 located on a common backplane 510. The instrument 503 and the subsystem 505 may each include an embodiment fault-tolerant computer system 100 with a reconfigurable coprocessor component as an embedded computer. The coprocessor card 509 of the high-performance space computer 501 may also include an embodiment fault-tolerant computer system 100 with a reconfigurable coprocessor component 200. Each of the computer systems 100 may be implemented using one or more FPGAs as described above.

An advantage of computer systems 100 according to various embodiments is that the computational performance may scale with the FPGA device it is implemented on, the CPU architecture used, and the inclusion of hardware accelerator coprocessors. Prior computer systems utilizing equivalent fault-mitigation technologies using a RISC-V 32-bit CPU have achieved 800 MIPS when clocked at 800 MHz on a Kintex-7 UltraScale which is a >200% coprocessor speedup compared to equivalent state-of-the-art small flight computers. This computation capability may be further increased by using hardware accelerator coprocessors. Simulations have shown that performing matrix operations in hardware may boost processing speed for some algorithms by as much as 500%.

Examples

Common in-space computing applications can be grouped broadly into three categories: sensor data processing, navigation and control, and communications. Within these applications, the most common algorithms tend to be associated with image processing. Sub-algorithms of image processing commonly relate to image filtering, edge detection, and pattern detection, including the use of ML-trained models for more sophisticated pattern recognition. In the case of pattern recognition algorithms, important hardware components and/or capabilities needed for acceleration may include: 1) fast data storage in registers; 2) floating-point math; and 3) matrix operations (i.e., averaging, convolution, translation, dilation, and rotation).

A proof-of-concept computer system was built including redundant processor cores and a coprocessor component on a single FPGA. The computer system was tested to verify the feasibility of implementing a floating-point unit (FPU) algorithm using hardware coprocessor acceleration. The nine most common floating-point operations (add, subtract, multiply, multiply-and-accumulate, divide, modulo, remainder, divide-by-2, and reciprocal) were first implemented as a full system. This system was determined to be too large to fit on a single Artix-7 100T FPGA along with the redundant processing cores of the computer system. Instead, the FPU functions were each implemented as separate hardware blocks in VHDL that could operate on 32-bit IEEE 754 numbers. The nine design blocks each had the exact same port definitions so that they could be implemented within the same coprocessor region on the FPGA that was subject to PR. After verifying that each block was functionally correct, could be synthesized on an FPGA, and was tested in hardware, a coprocessor region was defined on an Artix-7 100T FPGA that could accept the largest block size. By defining the coprocessor region for the largest FPU function, it guaranteed that the remaining eight functions would also fit. This new coprocessor region was able to fit on a single FPGA along with the redundant processing cores.

The coprocessor region was then implemented within a 16 MHz QMR CPU design as a memory-mapped peripheral. The memory map for the FPU contained addresses to hold the 32-bit inputs (A, B, C), the output (D), and status/control flags. The control flags allowed the CPU to start the computation from the main software loop in addition to indicating which floating point function was desired. The status flags allowed the CPU to monitor when the computation was complete in addition to when the coprocessor block was being reconfigured to a new function via PR. A test program was implemented that exercised each of the nine FPU functions using the following approach:

Load the FPU engine with known inputs by storing numbers in the coprocessors' memory map locations corresponding to inputs (A, B, and/or C).

Indicate the desired FPU function using the control registers for the FPU peripheral.

Begin the computation using the start flag in the control register.

Measure the PR time using an external logic analyzer via monitoring the DONE pin on the JTAG configuration interface to the FPGA.

Measure the computation time using an external logic analyzer via monitoring a signal that is routed to the GPIO of the FPGA development and is toggled upon the start and end of the FPU operation.

Read the result from the coprocessors' memory map location and write the results to a serial monitor to verify the FPU computed the correct results for the selected function.

Write the result to the HEX displays on the FPGA board for additional verification.

Figure 6:
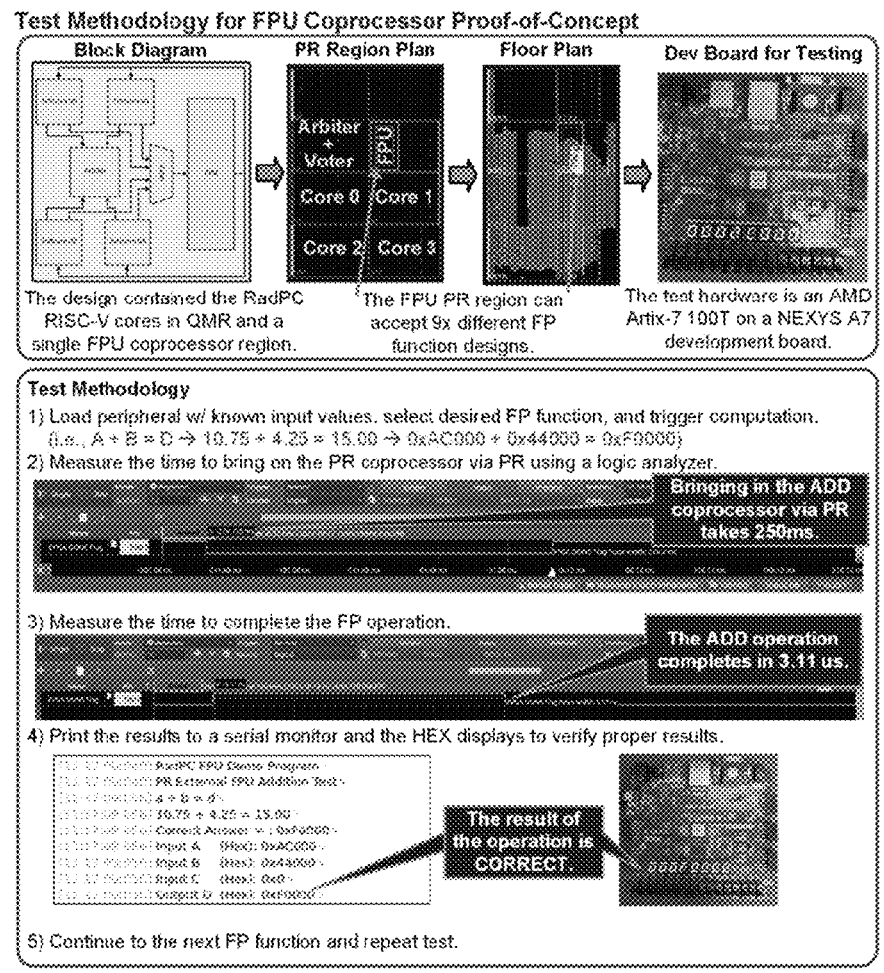
FIG. 6 illustrates the test methodology for proof-of-concept testing of a floating point unit (FPU) algorithm using a fault-tolerant computer system with a configurable coprocessor component according to various embodiments of the present disclosure.
Figure 7:
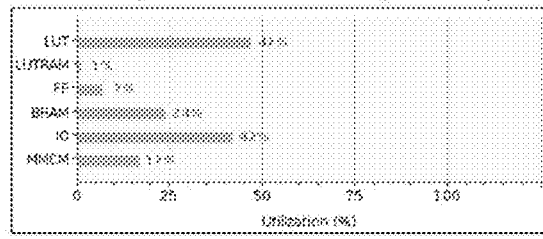
FIG. 7 shows the timing and resource utilization of the proof-of-concept FPU algorithm testing.

FIG. 6 illustrates the test methodology for the FPU proof-of-concept testing. FIG. 7 shows the timing and resource utilization for the remaining FPU tests. This proof-of-concept testing demonstrated that it is indeed possible to implement dynamically reconfigurable coprocessors within the fault-tolerant QMR framework. In this proof-of-concept, the PR time is larger than the compute time (250 ms vs 3.6 µs). However, this test was performed using a standard JTAG programming puck with a clock of 6 MHz for PR. In a final implementation the PR will be conducted using a link coming from an on-board device that can run up to 300% faster. Additionally, it is anticipated that the PR time penalty % will diminish as the complexity of the PR functions increases and its delay grows. The primary advantage of the FPU proof-of-concept is in the usage of FPGA resources. It was found that an FPGA system that implemented all 9× functions simultaneously could not fit on the Artix-7 100T FPGA along with the redundant processor cores. Only by using a partially reconfigurable coprocessor region for multiple functions was the system able to fit. This proves that there is a significant area advantage using the dynamic coprocessor approach.

Figure 8:
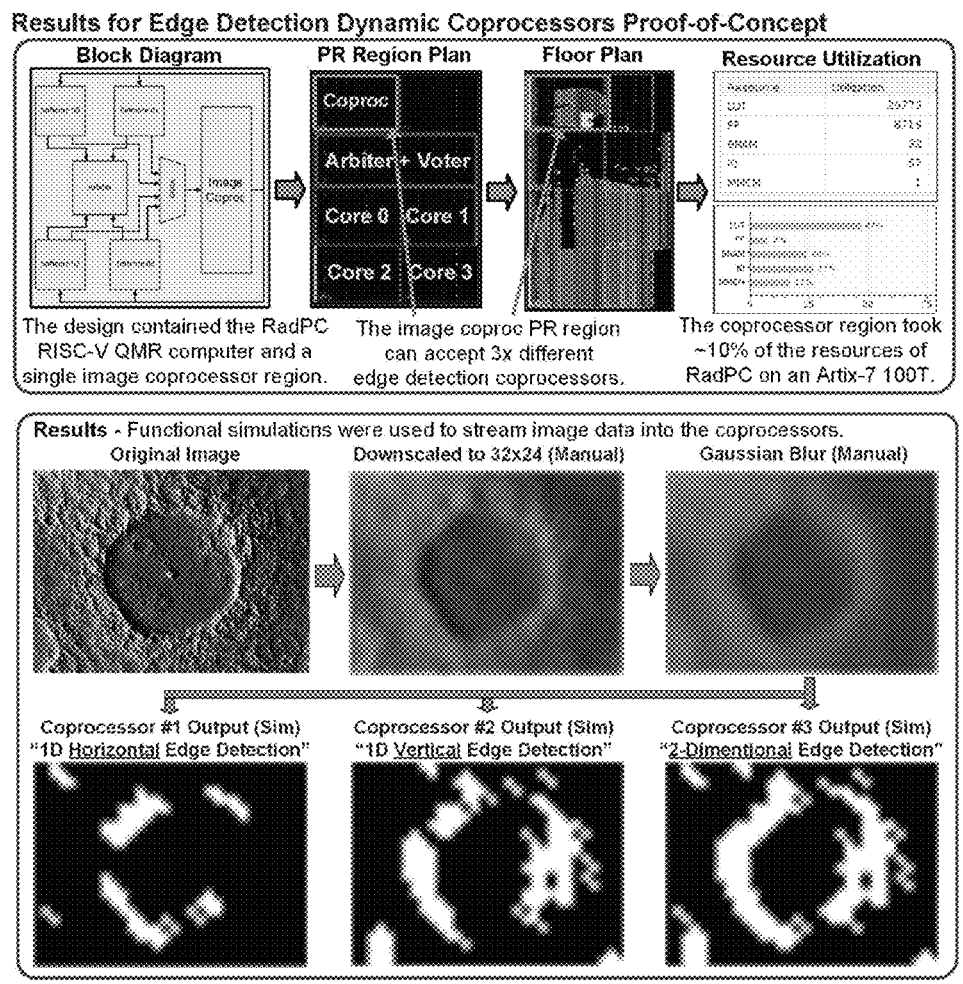
FIG. 8 shows verification setup and coprocessor results of a proof-of-concept testing to investigate the performance of an embodiment computer system with respect to edge detection algorithms.

Additional proof-of-concept testing was performed to investigate the performance of the computer system with respect to edge detection algorithms. Three image coprocessor blocks were designed that performed edge detection algorithms. The coprocessor functions implemented were: 1D horizontal edge detection, 1D vertical edge detection, and 2D (i.e., horizontal and vertical) edge detection. A reconfigurable coprocessor region was defined within the computer system that could accommodate the size of the largest edge detection coprocessor design and a common interface to the coprocessors was defined. This allowed the coprocessor PR block to be synthesized and floor planned on an Artix-7 100T FPGA to determine the region's FPGA resources usage. Without a physical way to stream image data into the FPGA, verification was performed through simulation. A lunar image was downscaled to 32×24 pixels and filtered manually using a Gaussian blur. The resulting image was then provided to the coprocessor models through a VHDL testbed. The coprocessor simulation results were directed to a file where the data was reconstructed into an image to verify the coprocessors were operational. FIG. 8 shows the verification setup and coprocessor results. These results verified that the coprocessor approach can be used for more complicated image processing algorithms. The FPGA resource usage for the edge detection functions was ~10% of the resources needed for the QMR processor core implementation on an Artix-7 100T FPGA. Since the QMR processor core will remain the same size as the full system is moved to larger FPGAs, the resources available for the coprocessor component will be much larger than this proof-of-concept. The outputs of the coprocessor functions verified that a hardware implementation of edge detection can successfully be implemented and interact with the fault-tolerant QMR processor core as a peripheral.

Although the foregoing refers to particular embodiments, it will be understood that the disclosure is not so limited. It will occur to those of ordinary skill in the art that various modifications may be made to the disclosed embodiments and that such modifications are intended to be within the scope of the disclosure. Compatibility is presumed among all embodiments that are not alternatives of one another. The word "comprise" or "include" contemplates all embodiments in which the word "consist essentially of" or the word "consists of" replaces the word "comprise" or "include," unless explicitly stated otherwise. Where an embodiment using a particular structure and/or configuration is illustrated in the present disclosure, it is understood that the present disclosure may be practiced with any other compatible structures and/or configurations that are functionally equivalent provided that such substitutions are not explicitly forbidden or otherwise known to be impossible to one of ordinary skill in the art. All publications, patents and patent applications referred to herein are incorporated by reference in their entirety to the same extent as if each individual publication, patent or patent application was specifically and individually indicated to be incorporated by reference in its entirety.

The invention claimed is:

1. A computer system, comprising:
a plurality of processor cores configured to simultaneously execute identical sets of processor-executable instructions; and
a coprocessor component comprising:
a data storage component; and
a configurable logic region, wherein the plurality of processor cores are configured with processor-executable instructions to perform operations comprising:
configuring the configurable logic region of the coprocessor component with a first coprocessing module; and
controlling the first coprocessing module to perform first processing operations on data located in the data storage component;
wherein the plurality of processor cores are configured with processor-executable instructions to perform operations further comprising:
reconfiguring the configurable logic region of the coprocessor component with a second coprocessing module; and
controlling the second coprocessing module to perform second processing operations the data located in the data storage component;
wherein the configurable logic region of the coprocessor component is reconfigured using a Partial Reconfiguration (PR) process;
wherein the plurality of processor cores are configured with processor-executable instructions to perform operations further comprising:
sequentially swapping in and out of the configurable logic region a plurality of different coprocessor modules using the PR process, wherein each coprocessor module comprises a portion of a data processing algorithm.

2. The computer system of claim 1, wherein the data processing algorithm comprises at least one of a floating point unit algorithm, a matrix operation algorithm, an imaging processing algorithm, an artificial intelligence algorithm, and a machine learning algorithm.

3. The computer system of claim 2, wherein the data processing algorithm comprises an image processing algorithm comprising at least one of image filtering, edge detection, and pattern recognition.

4. The computer system of claim 1, wherein the plurality of processor cores are configured with processor-executable instructions to perform operations further comprising:
reconfiguring the configurable logic region to have a blank or "dummy" configuration when the coprocessor component is not in use.

5. A computer system, comprising:
a plurality of processor cores configured to simultaneously execute identical sets of processor-executable instructions; and
a coprocessor component comprising:
a data storage component; and
a configurable logic region, wherein the plurality of processor cores are configured with processor-executable instructions to perform operations comprising:
configuring the configurable logic region of the coprocessor component with a first coprocessing module; and
controlling the first coprocessing module to perform first processing operations on data located in the data storage component;
wherein each of the processor cores comprises a central processing unit (CPU) and a local memory; and
wherein data is input into the data storage component of the coprocessor component without being stored within the local memory of any of the processor cores.

6. A computer system, comprising:
a plurality of processor cores configured to simultaneously execute identical sets of processor-executable instructions; and
a coprocessor component comprising:
a data storage component; and
a configurable logic region, wherein the plurality of processor cores are configured with processor-executable instructions to perform operations comprising:
configuring the configurable logic region of a coprocessor component with a first coprocessing module; and
controlling the first coprocessing module to perform first processing operations on data located in the data storage component;
wherein each of the processor cores comprises a central processing unit (CPU) and a local memory; and
wherein a coprocessor core is memory mapped as a peripheral of the plurality of processor cores.

7. A computer system, comprising:
a plurality of processor cores configured to simultaneously execute identical sets of processor-executable instructions; and
a coprocessor component comprising:
a data storage component; and
a configurable logic region, wherein the plurality of processor cores are configured with processor-executable instructions to perform operations comprising:
configuring the configurable logic region of the coprocessor component with a first coprocessing module; and
controlling the first coprocessing module to perform first processing operations on data located in the data storage component;
wherein each of the processor cores comprises a central processing unit (CPU) and a local memory; and
wherein the computer system comprises at least four redundant processor cores, and the computer system further comprises:
a voting and repair component configured to monitor register values of each of the redundant processor cores and to overwrite faulty register values with a majority register value.

8. The computer system of claim 7, wherein the computer system further comprises:
a memory monitor comprising a voting component that is configured to iteratively read each memory address in the local memory of each of the redundant processor cores, and to overwrite faulty memory values with a majority memory value.

\* \* \* \* \*